Oct. 28, 1930.   W. H. WASHBURNE   1,779,685
DECELERATION INDICATOR
Filed Aug. 28, 1929
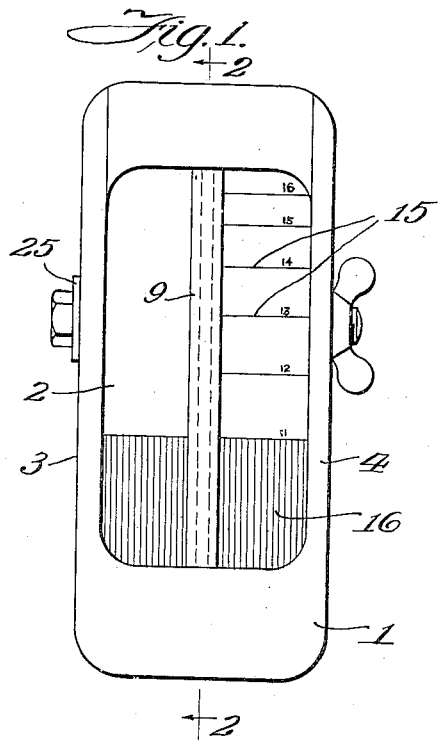
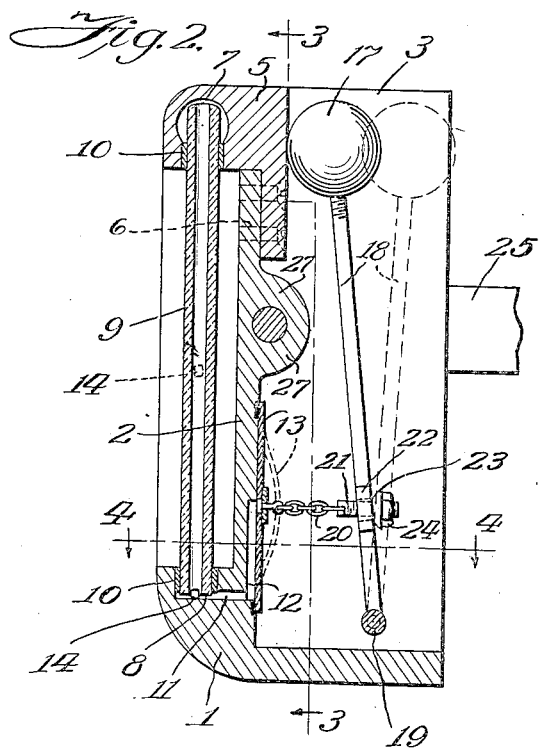
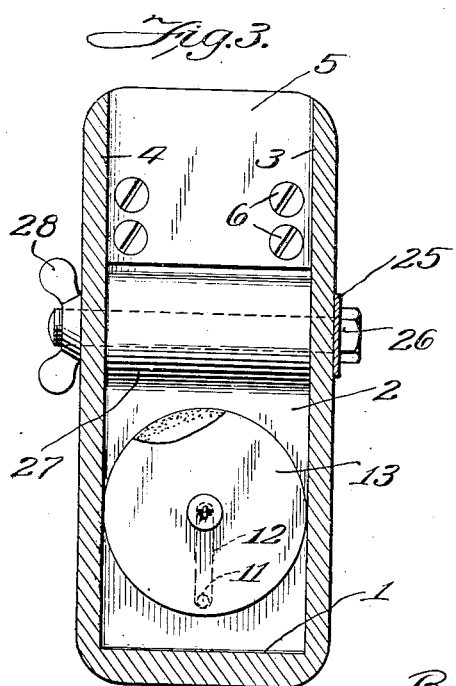
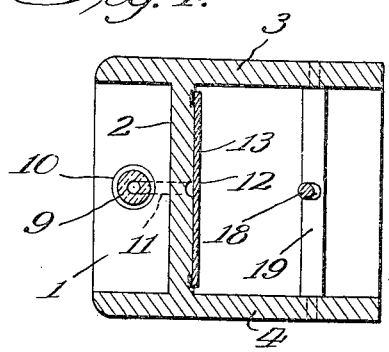
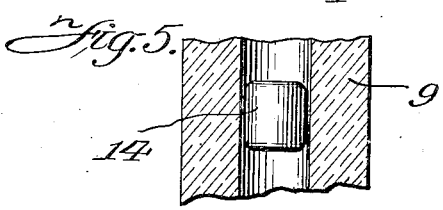
Inventor
Wm H. Washburne
By Wm F. Freudenreich, Attys Patented Oct. 28, 1930

1,779,685

UNITED STATES PATENT OFFICE

WILLIAM H. WASHBURNE, OF AURORA, ILLINOIS

DECELERATION INDICATOR

Application filed August 28, 1929. Serial No. 389,079.

The present invention has for its primary object to produce a simple and novel instrument for indicating the rate at which an automobile or other vehicle slows down when the brakes are applied, thereby apprising the driver whether or not the brakes are operating efficiently.

In carrying out my invention I employ a body of confined air or other gas, a portion of which is contained within a small vertical tube; there being in the tube a very light floating piston that normally rests at the bottom of the tube. When the brakes are applied on the vehicle carrying my improved device, the inertia of a massive movable element causes an enlargement of the space in which the air is confined, in such a way that air is drawn down past the piston to help fill the enlarged space. When the vehicle comes to rest the said mass is restored to its original position, reducing the air space to its normal size and consequently causing the air that was drawn down past the piston to move up again; the rising column of air pushing the piston in advance of the same until a state of equilibrium is reached, whereupon the piston will slowly descend by gravity. By placing suitable graduations or indicating characters beside the tube, the point to which the piston rises indicates the rate at which deceleration took place. The height to which the piston rises depends upon the amount of reduction of the pressure at the beginning of the cycle, and therefore the instrument might be calibrated to indicate the amount of this reduction of pressure. Furthermore, the same principle may be employed to indicate a rise in air or gas pressure, by causing air under pressure to flow down through the tube and then permitting equilibrium to be established by a return or upflow of the air or gas. Therefore, viewed in one of its aspects, the present invention may be said to have for its object to produce a simple and novel instrument for measuring the pressure of air or other gas.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a front view of a device constructed in accordance with my invention; Fig. 2 is a section on line 2—2 of Fig. 1, showing in full and dotted lines different positions of certain of the parts; Fig. 3 is a section on line 3—3 of Fig. 2; Fig. 4 is a section on line 4—4 of Fig. 2; and Fig. 5 is an enlarged view of the floating piston and a fragment of the tube in which it moves, the tube being shown in section.

Referring to the particular embodiment of my invention shown in the drawing, 1 represents a base from which rises what may be termed a front wall 2, placed somewhat in rear of the front edge of the base. Two side walls, 3 and 4, extend along the sides of the base in front of and to the rear of the front wall; these three walls being conveniently made integral with the base. A separate top piece 5 fits between the upper ends of the side walls and is secured to the front wall by screws 6; this top piece overlying that part of the base projecting forward beyond the front wall. In the top piece is a cavity or chamber 7 opening out through the under side of the top piece. There is a similar cavity or chamber 8 in the top of the base directly below the chamber 7. A transparent tube 9 extends between and connects said chambers, the openings through which the ends of the tube pass being sealed by rubber bushings 10 fitting tightly around the tube and into said openings. A passage 11 leads from the lower chamber 8 through the front wall and there joins the lower end of a vertical groove 12 cut in the rear face of that wall. A flexible rubber disc 13 whose radius is somewhat greater than the length of the groove 12 lies against the rear face of the said front wall with its center at about the upper end of the groove 12. The disc is fastened to the wall at the edges, whereas the central portion is unattached; this being conveniently accomplished by cementing a continuous narrow marginal strip of the rubber to the wall. The marginal portion of the diaphragm may of course be secured to the wall in any usual or suitable way as, for example, by simply cementing it to the wall, as shown.

In the tube is a floating piston 14 slightly smaller in diameter than the internal diameter of the tube. The piston is in the form of a cylinder whose length is about equal to its diameter, the ends of the cylinder being rounded. The piston must be very light, and is preferably made of aluminum. Normally the piston lies in the lower end of the tube. The size, shape and mass of the piston are such that air or other gas may flow down into the chamber 8 past the same whereas, upon an upflow of gas, the piston is lifted through a height depending upon the quantity of gas that is transferred. I have found that the rounded ends of the piston cause it to rotate in rising and falling, thus keeping it centered in the tube and preventing it from sticking to the sides of the tube.

The space composed of the upper and lower chambers, the bore of the tube, the passage 11 and the groove 12 is filled with a gas, conveniently air at atmospheric pressure. If the size of this air-filled space is temporarily varied so as to cause a down flow of air into the lower part of the space then, upon restoration of the space to its original size, some air must again flow upward; such up-flowing air pushes the piston ahead of it until a condition of equilibrium is reached; whereupon the piston will descend slowly by gravity.

In the arrangement shown, the effective size of the air space is varied by flexing the disc or diaphragm 13. This is accomplished by connecting to the center of the diaphragm a movable weight. When the device is decelerated from a movement in a direction tending to carry the diaphragm toward the weight, the inertia of the latter causes it to continue moving ahead at a higher speed than the rest of the device, thus pulling out the diaphragm as indicated in dotted lines in Fig. 2 and creating a partial vacuum within the aforesaid air space. Since the increase in size of the space occurs at the lower end, some of the air is drawn down through the tube, past the piston. Then, when the device comes to rest, the pressure of the atmosphere on the diaphragm will cause the diaphragm to be restored to its normal condition, the weight being drawn back with the same. This results in restoring the air space to its normal size and, therefore, the air that flowed down past the piston must flow up again. As heretofore explained, the piston is pushed up by the air say, for example, to the position indicated in dotted lines in Fig. 2. When the pressure throughout the air space becomes equalized, there is nothing to hold up the piston and it therefore slowly drops down to its normal position of rest. By placing on the front face of the wall 2 suitable markings or graduations, as indicated at 15, a reading may be had of the height to which the piston is lifted. By properly calibrating the instrument, the markings may indicate the rate of deceleration of a vehicle on which the instrument is mounted. In the arrangement shown, the markings indicate a rate of deceleration in feet per second. In other words, if the piston, upon stopping of the vehicle rises to the mark eleven, the deceleration has been at the rate of eleven feet per second. The lower part of what may be termed the scale may be a red area, as indicated at 16, to indicate that the brakes are not working properly if the piston does not rise above the red area upon stopping the vehicle.

The actuating weight is shown as taking the form of a ball 17 screwed upon the upper end of a rod or lever 18 lying within the space between the side walls 3 and 4, of the casing, and behind the front wall. The rod or lever is fixed at its lower end to a transverse shaft 19 extending between and journalled in the walls 3 and 4 so as to permit the lever to swing in a plane at right angles to the front wall. A flexible connection 20, secured at one end to the center of the diaphragm has at its other end a screwthreaded piece 21 that passes through a hole 22 in the lever; this hole being larger in diameter than the part 21. Surrounding the part 21 on the rear side of the lever is a washer 23 having a convex side engaged with the lever and held in place by means of an adjusting nut 24. By means of the screwthreaded part 21 and the nut 24, adjustments may be made so that the ball on the inertia lever rests against the rear side of the top piece 5, or some other suitable stop when the diaphragm is in its normal flat condition. By screwing the ball up or down on the lever, the force that the inertia device will exert upon the diaphragm, during the operation of the instrument, may be regulated; thus permitting standard scales or graduations to be employed in the manufacture of a large number of these instruments because they may all be calibrated by simply adjusting the weights or balls.

The device may be attached to the steering post or other stationary part of an automobile structure by means of a suitable bracket 25, of which only a portion is shown; this bracket being secured to the casing by means of a bolt 26 passing through the same and through a thickened part 27 on the front wall of the casing. The bolt may be provided with a thumb nut 28 to permit the casing to be adjusted on the bracket so that the tube will be exactly vertical.

While I have described my invention as embodied in a device housing a confined volume of air in a space that may be temporarily enlarged to produce a partial vacuum, it is not limited, in its broad aspects to this particular construction. The reading given by the instrument in the particular device illustrated depends upon the extent to which the pressure in the air space is decreased; the more rapid the deceleration, the greater being the movement of the inertia lever relative to the casing or housing. The greater the reduction in pressure, the higher the piston will rise when the initial pressure is restored. Therefore, viewed in one aspect, the instrument may be said to indicate the extent of reduction in pressure in the confined air space; or, stated still more broadly, the instrument may be said to indicate pressures in general; it being immaterial what the pressure of the air or gas is that flows down past the piston, because the return of the air or gas will lift the piston to a height that will indicate the difference between the initial pressure and the pressure, negative or positive with respect to atmospheric pressure, at the moment the air or gas is ready to start on its return passage.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:—

1. In combination, a housing including a vertical transparent tube enclosing a space of which a portion lies below the tube, a light loose piston in the tube and normally resting in the lower end of the latter, and means for causing gas to flow down past the piston into the lower portion of the space and then causing the gas to reverse its direction of flow, the size, shape and mass of the piston being such that the piston is lifted by upflowing gas.

2. In combination, a housing including a vertical transparent tube enclosing a space of which a portion lies below the tube, a light loose piston in the tube and normally resting in the lower end of the latter, and means for causing gas to flow down past the piston into the lower portion of the space and then causing the gas to reverse its direction of flow, the size, shape and mass of the piston being such that the piston is lifted by upflowing gas, and there being markings associated with the tube to give readings of the heights to which the piston is lifted.

3. In combination, a housing including a vertical transparent tube enclosing a space of which a portion lies below the tube, a light loose piston in the tube and normally resting in the lower end of the latter, and means for causing gas to flow down past the piston into the lower portion of the space and then causing the gas to reverse its direction of flow, the piston being an aluminum cylinder slightly smaller in diameter than the interior of the tube and having its ends rounded.

4. In combination, means including a vertical tube enclosing a gas-filled space, a light piston loose in said tube and normally resting in the lower end of the tube, and means to vary the size of said space to cause a portion of the gas to flow down past said piston and then back in the upward direction, the shape and the mass of the piston being such that the piston is lifted by the upwardly-moving gas and then drops by gravity after the pressure on opposite sides has become equalized.

5. In combination, means including a vertical tube enclosing a gas-filled space, a light piston loose in said tube and normally resting in the lower end of the tube, and means to vary the size of said space to cause a portion of the gas to flow down past said piston and then back in the upward direction, the shape and the mass of the piston being such that the piston is lifted by the upwardly-moving gas and then drops by gravity after the pressure on opposite sides has become equalized, said tube being transparent, and there being markings associated with the tube to permit readings to be made of the heights to which the piston rises.

6. In combination, a housing including a vertical transparent tube enclosing a gas-filled space comprising upper and lower chambers connected by the tube, a light loose piston in the tube normally resting in the lower end of the tube, and means for temporarily varying and then restoring the size of one of said chambers to cause gas to flow down past the piston into the lower chamber and then back again in the upward direction, the size, shape and mass of the piston being such that the piston is lifted by the upflowing gas and then slowly descends to its normal position when the pressure becomes equalized throughout said space.

7. In combination, a housing including a vertical transparent tube enclosing a gas-filled space comprising upper and lower chambers connected by the tube, a light loose piston in the tube normally resting in the lower end of the tube, and means for temporarily varying and then restoring the size of one of said chambers to cause gas to flow down past the piston into the lower chamber and then back again in the upward direction, the size, shape and mass of the piston being such that the piston is lifted by the upflowing gas and then slowly descends to its normal position when the pressure becomes equalized throughout said space, and there being markings associated with the tube to give readings of the heights to which the piston rises.

8. In combination, a housing including a vertical transparent tube enclosing a gas-filled space comprising upper and lower chambers connected by the tube, a light loose piston in the tube normally resting in the lower end of the tube, a wall of one of the chambers being flexible to permit the size of that chamber to be varied temporarily to permit gas to flow down past the piston into the lower chamber and then to rise again when the chamber having the flexible wall is restored to its original size, the size, shape and mass of the piston being such that the piston is lifted by the upflowing gas and drops by gravity when the pressure throughout said space is equalized.

9. In combination, a housing including a vertical transparent tube enclosing a gas-filled space comprising upper and lower chambers connected by the tube, a light loose piston in the tube normally resting in the lower end of the tube, a wall of one of the chambers being flexible to permit the size of that chamber to be varied temporarily to permit gas to flow down past the piston into the lower chamber and then to rise again when the chamber having the flexible wall is restored to its original size, the size, shape and mass of the piston being such that the piston is lifted by the upflowing gas and drops by gravity when the pressure throughout said space is equalized, and there being markings associated with the tube to give readings of the heights to which the piston is lifted.

10. In a device of the character described, a housing including a vertical tube enclosing a space filled with a gas, a light loose piston in the tube and normally resting in the lower end of the tube, a movable weight, and means associated with said weight to bring about a change in the size of said space and cause a flow of gas down past the piston when a rapid movement of the device in one direction is decelerated and thereafter cause the said space to be restored to its original size and the piston to be lifted by the upflowing gas when the device comes to rest.

11. In a device of the character described, a housing including a tube enclosing a gas-filled space comprising upper and lower chambers joined by the tube, a light loose piston in the tube and normally resting in the lower end of the tube, a wall of one of the chambers being flexible to permit the size of said space to be temporarily varied to cause gas to flow down past the piston into the lower chamber and then up again through the tube to lift the piston when said wall is restored to its normal condition, a movable weight, and a connection between the weight and said flexible wall, the parts being so proportioned that when a movement of said device in one direction is decelerated the inertia of the weight causes the weight to actuate said flexible wall to vary the effective size of said space and thereafter the flexible wall is restored to its normal condition when said device comes to rest.

12. In a measuring instrument, a vertical tube, a light piston smaller in diameter than the internal diameter of the tube located in the tube and normally resting in the lower end thereof, means associated with the lower end of the tube to form a closed chamber communicating with the tube, and means for causing a gas to flow down through the tube past the piston and into said chamber and then to flow up again through the tube and lift the piston.

In testimony whereof, I sign this specification.

WILLIAM H. WASHBURNE.